United States Patent
Bisbee et al.

(10) Patent No.: US 10,181,955 B2
(45) Date of Patent: Jan. 15, 2019

(54) METHOD FOR CONVERSATION OF AN ORIGINAL PAPER DOCUMENT INTO AN AUTHENTICATED ORIGINAL ELECTRONIC INFORMATION OBJECT

(71) Applicants: Stephen F Bisbee, Lutherville, MD (US); Bryan K Caporlette, Severna Park, MD (US); Adam J Attinello, Fulton, MD (US); Daniel S Bender, Victor, ID (US); Valerie F Daly, Broad Run, VA (US)

(72) Inventors: Stephen F Bisbee, Lutherville, MD (US); Bryan K Caporlette, Severna Park, MD (US); Adam J Attinello, Fulton, MD (US); Daniel S Bender, Victor, ID (US); Valerie F Daly, Broad Run, VA (US)

(73) Assignee: eOriginal, Inc., Baltimore, MD (US)

( * ) Notice: Subject to any disclaimer, the term of this patent is extended or adjusted under 35 U.S.C. 154(b) by 248 days.

(21) Appl. No.: 15/169,054

(22) Filed: May 31, 2016

(65) Prior Publication Data
US 2016/0352523 A1 Dec. 1, 2016

Related U.S. Application Data

(60) Provisional application No. 62/168,384, filed on May 29, 2015.

(51) Int. Cl.
*H04L 9/32* (2006.01)
*H04L 29/06* (2006.01)

(52) U.S. Cl.
CPC .......... *H04L 9/3247* (2013.01); *H04L 9/3263* (2013.01); *H04L 63/0823* (2013.01); *H04L 63/126* (2013.01)

(58) Field of Classification Search
CPC . H04L 9/3247; H04L 9/3263; H04L 63/0823; H04L 63/126
See application file for complete search history.

(56) References Cited

U.S. PATENT DOCUMENTS 5,615,268 A * 3/1997 Bisbee .................. G06Q 20/00
380/30
5,748,738 A 5/1998 Bisbee et al.
(Continued)

OTHER PUBLICATIONS

R. L. Rivest et al., "A Method for Obtaining Digital Signatures and Public-Key Cryptosystems," Communications of the ACM vol. 21, pp. 120 126 (Feb. 1978).
(Continued)

*Primary Examiner* — Theodore C Parsons
*Assistant Examiner* — Carlos M De Jesus Lassala
(74) *Attorney, Agent, or Firm* — Gordon Feinblatt LLC; Royal W. Craig

(57) ABSTRACT

Method for converting an original paper document into an original information object, and for subsequent electronic transmission, storage, and retrieval of verifiable copies of the stored original information object without the Trusted Repository relinquishing control of the original information object. The user first converts the blue-ink-signed paper document into an electronic information object. On deposit of this information object into the Trusted Repository, the user is required to destroy or permanently designate the blue-ink-signed paper document and locally-retained files as copies. The Trusted Repository then requires the user to establish the authenticity of the electronic information object by verifying that it is now the only authoritative and original copy. The Trusted Repository then creates the original authenticated information object by appending a date-time stamp and its digital signature and certificate (signature block). This Trusted Repository action demonstrates the
(Continued)

Trusted Repository's assumption of control of the original authenticated information object.

17 Claims, 9 Drawing Sheets

(56) References Cited

U.S. PATENT DOCUMENTS

| | | | |
|---|---|---|---|
| 6,237,096 B1 | 5/2001 | Bisbee et al. | |
| 6,367,013 B1* | 4/2002 | Bisbee | G06Q 20/00 713/158 |
| 7,020,645 B2* | 3/2006 | Bisbee | G06F 21/33 |
| 7,162,635 B2* | 1/2007 | Bisbee | G06Q 20/00 713/176 |
| 7,523,315 B2* | 4/2009 | Hougaard | G06Q 10/10 713/176 |
| 7,743,248 B2 | 6/2010 | Bisbee et al. | |
| 8,402,276 B2* | 3/2013 | Berringer | G06F 21/64 713/176 |
| 8,924,302 B2* | 12/2014 | Bisbee | H04L 9/321 705/50 |
| 2006/0190489 A1* | 8/2006 | Vohariwatt | G06K 9/00469 |
| 2008/0016358 A1* | 1/2008 | Filreis | H04L 63/123 713/176 |

OTHER PUBLICATIONS

M. E. Hellman, "The Mathematics of Public-Key Cryptography", Scientific American, vol. 234, No. 8, pp. 146 152, 154 157 (Aug. 1979).

W. Diffie, "The First Ten Years of Public-Key Cryptography", Proceedings of the IEEE, vol. 76, pp. 560 577 (May 1988).

C. E. Shannon, "Communication Theory of Secrecy Systems", Bell Sys. Tech. J. vol. 28, pp. 656 715 (Oct. 1949).

* cited by examiner

Transaction Activity History Report

Requestor: Val Daly
Request Date: 05/25/2016 09:56:01 AM EDT
Requestor Organization: ABC Leasing Company
Owning Organization: ABC Leasing Company Transaction ID: Joe Lessee LLC
Transaction Vault ID: 1457317
Creation Date: 05/25/2016 09:53:04 AM EDT

| Date | Action | Recorded By | Participant | IP Address | Organization |
|---|---|---|---|---|---|
| 05/25/2016 09:53:50 AM EDT | Document Added | Command Center | Val Daly | 108.48.123.163 | ABC Leasing Company |
| 05/25/2016 09:53:04 AM EDT | Created Transaction | Command Center | Val Daly | 108.48.123.163 | ABC Leasing Company |

Additional Event Information

| Date | Action | Additional Information |
|---|---|---|
| 05/25/2016 09:53:50 AM EDT | Document Added | Document Name=Paper In-Lease Agreement, Document Sid=1457318 |

Document Information

| Creation Date | Document ID | Document Vault ID | Status |
|---|---|---|---|
| 05/25/2016 09:53:50 AM EDT | Paper In-Lease Agreement | 1457318 | All States |

This Transaction Activity History Report was produced for the transaction identified by eCore Transaction ID 1457317 on 05/25/2016 09:56:01 AM EDT by the eCore® software, operated for ABC Leasing Company. This Transaction Activity History Report is provided in support of either: (i) the Certificate regarding the Paper Out® export of an Electronic Original® document; or (ii) an independent request for this transaction history. The digital signature on this document confirms the state of the events recorded for the transaction as of the date and time of the request of this report and that no action has been altered since the action occurred. Trademarks are property of eOriginal, Inc. All rights reserved.

Signed by: eCore® on May 25, 2016

Page 1 of 1

FIG. 2

Document Activity History Report

Requestor: Val Daly
Request Date: 05/25/2016 09:58:21 AM EDT
Requestor Organization: ABC Leasing Company

Transaction
Transaction ID: Joe Lessee LLC
Vault ID: 1457317

Document
Document ID: Paper In-Lease Agreement
Vault ID: 1457318
Creation Date: 05/25/2016 09:53:50 AM EDT
eCertainty® Validated On: 05/25/2016 09:57:17 AM EDT
Vault Type: Original
Owning Organization: ABC Leasing Company

| Date | Action | Recorded By | Participant | IP Address | Audit |
|---|---|---|---|---|---|
| 05/25/2016 09:57:17 AM EDT | Returned Watermarked Copy | Command Center | Val Daly <vdaly@eoriginal.com> | 108.48.123.163 | |
| 05/25/2016 09:54:33 AM EDT | Created Signed Version | Command Center | Val Daly <vdaly@eoriginal.com> | 108.48.123.163 | X |
| 05/25/2016 09:54:32 AM EDT | Confirmed Paper Destruction | Command Center | Val Daly <vdaly@eoriginal.com> | 108.48.123.163 | X |
| 05/25/2016 09:53:51 AM EDT | Submitted Paper In | Command Center | Val Daly <vdaly@eoriginal.com> | 108.48.123.163 | X |
| 05/25/2016 09:53:51 AM EDT | Created Unsigned Version | Command Center | Val Daly <vdaly@eoriginal.com> | 108.48.123.163 | |
| 05/25/2016 09:53:50 AM EDT | Created Document | Command Center | Val Daly <vdaly@eoriginal.com> | 108.48.123.163 | |

Additional Event Information

| Date | Action | Additional Information |
|---|---|---|
| 05/25/2016 09:53:50 AM EDT | Created Document | Document Type=Paper In |

Signature Information

| Details | Digital Certificate Information | Displayed Value |
|---|---|---|
| Block: CONFIRM_PAPER_DESTRUCTION<br>Date: 05/25/2016 09:54:33 AM EDT | Issued to: eOriginal, Inc<br>Issued by: Entrust, Inc. | *Val Daly* |
| Block: Vault Tamper Seal<br>Date: 05/25/2016 09:53:35 AM EDT | Issued to: eOriginal, Inc<br>Issued by: Entrust, Inc. | |

This Document Activity History Report was produced for the document identified by eCore Document ID 1457318 on 05/25/2016 09:58:21 AM EDT by the eCore® software, operated for ABC Leasing Company. This Document Activity History Report is provided in support of a Certificate regarding either: (i) the Paper Out™ export of an Electronic Original™ document; or (ii) the production of a Certified Print™ copy for legal purposes. This Document Activity History Report may also have been provided when an independent request for this document history was made. The digital signature on this document confirms the state of the events recorded for the document as of the date and time of the request of this report. Additionally, a digital signature confirms that any action marked AUDIT has not been altered since the action occurred. Trademarks are property of eOriginal, Inc. All rights reserved.

Signed by: eCore® on May 25, 2016

FIG. 3

This is a copy of a document that is managed by the electronic vault

Maryland Agreement to Lease Equipment (with Warranty)

THIS AGREEMENT TO LEASE EQUIPMENT ("Lease") is made and effective August 1, 2007 by and between ABC Leasing Company, ("Lessor") and Joe Lessee, LLC ("Lessee").

Lessor desires to lease to Lessee, and Lessee desires to lease from Lessor, certain tangible personal property.

NOW, THEREFORE, in consideration of the mutual covenants and promises hereinafter set forth, the parties hereto agree as follows:

1. Lease.

Lessor hereby leases to Lessee, and Lessee hereby leases from Lessor, the following described equipment (the "Equipment"):

10 computers; and
10 flat screen monitors

2. Term.

The term of this Lease shall commence on December 1, 2007 and shall expire thirty-six (36) months thereafter.

3. Shipping.

Lessee shall be responsible for shipping the Equipment to Lessee's premises.

4. Rent and Deposit.

A. The monthly rent for the Equipment shall be paid in advance in installments of $267.00 each month, beginning on January 1, 2008 and on the first day of each succeeding month throughout the term hereof, at 351 W. Camden Street, Baltimore, Maryland 21201, or at such other place as Lessor may designate from time to time. Any installment payment not made by the tenth (10th) day of the month shall be considered overdue and in addition to Lessor's other remedies, Lessor may levy a late payment charge equal to one percent (1%) per month on any overdue amount. Rent for any partial month shall be prorated.

B. Lessee shall pay a deposit in the following amount prior to taking possession of the Equipment: one hundred dollars ($100.00). The deposit will be refunded to Lessee promptly following Lessee's performance of all obligations in this Lease.

5. Use.

The original document is held by ABC Leasing Company and this copy was created on 05/25/2016 09:57:17 AM EDT.
Transaction: 1457337; Document: 1453318

FIG. 4A

This is a copy of a document that is managed by the electronic vault

Lessee shall use the Equipment in a careful and proper manner and shall comply with and conform to all national, state, municipal, police and other laws, ordinances and regulations in any way relating to the possession, use or maintenance of the Equipment.

6. <u>Right to Lease</u>.

LESSOR WARRANTS THAT LESSOR HAS THE RIGHT TO LEASE THE EQUIPMENT, AS PROVIDED IN THIS LEASE.

7. <u>Repairs</u>.

Lessee, at its own cost and expense, shall keep the Equipment in good repair, condition and working order and shall furnish any and all parts, mechanisms and devices required to keep the Equipment in good mechanical working order.

8. <u>Loss and Damage</u>.

A. Lessee hereby assumes and shall bear the entire risk of loss and damage to the Equipment from any and every cause whatsoever. No loss or damage to the Equipment or any part thereof shall impair any obligation of Lessee under this Lease which shall continue in full force and effect through the term of the Lease.

B. In the event of loss or damage of any kind whatever to the Equipment, Lessee shall, at Lessor's option:

(i) Place the same in good repair, condition and working order; or
(ii) Replace the same with like equipment in good repair, condition and working order; or
(iii) Pay to Lessor the replacement cost of the Equipment.

9. <u>Surrender</u>.

Upon the expiration or earlier termination of this Lease, Lessee shall return the Equipment to Lessor in good repair, condition and working order, ordinary wear and tear resulting from proper use thereof alone excepted, by delivering the Equipment at Lessee's cost and expense
to such place as Lessor shall specify within the city or county in which the same was delivered to Lessee.

10. <u>Insurance</u>.

Lessee shall procure and continuously maintain and pay for:

A. All risk insurance against loss of and damage to the Equipment for not less than the full replacement value of the Equipment, naming Lessor as loss payee, and;

The original document is held by ABC Leasing Company and this copy was created on 05/25/2016 09:57:17 AM EDT. Transaction: 1457337; Document: 1453318

FIG. 4B

*This is a copy of a document that is managed by the electronic vault*

B. Combined public liability and property damage insurance with limits as approved by Lessor, naming Lessor as additionally named insured and a loss payee.

The insurance shall be in such form and with such company or companies as shall be reasonably acceptable to Lessor, shall provide at least thirty (30) days advance written notice to Lessor of any cancellation, change or modification, and shall provide primary coverage for the protection of Lessee and Lessor without regard to any other coverage carried by Lessee or Lessor protecting against similar risks.

Lessee shall provide Lessor with an original policy or certificate evidencing such insurance. Lessee hereby appoints Lessor as Lessee's attorney in fact with power and authority to do all things, including, but not limited to, making claims, receiving payments and endorsing documents, checks or drafts necessary or advisable to secure payments due under any policy of insurance required under this Agreement.

11. Taxes.

Lessee shall keep the Equipment free and clear of all levies, liens and encumbrances. Lessee, or Lessor at Lessee's expense, shall report, pay and discharge when due all license and registration fees, assessments, sales, use and property taxes, gross receipts, taxes arising out of receipts from use or operation of the Equipment, and other taxes, fees and governmental charges similar or dissimilar to the foregoing, together with any penalties or interest thereon, imposed by any state, federal or local government or any agency, or department thereof, upon the Equipment or the purchase, use, operation or leasing of the Equipment or otherwise in any manner with respect thereto and whether or not the same shall be assessed against or in the name of Lessor or Lessee. However, Lessee shall not be required to pay or discharge any such tax or assessment so long as it shall, in good faith and by appropriate legal proceedings, contest the validity thereof in any reasonable manner which will not affect or endanger the title and interest of Lessor to the Equipment; provided, Lessee shall reimburse Lessor for any damages or expenses resulting from such failure to pay or discharge.

12. Lessor's Payment.

In case of failure of Lessee to procure or maintain said insurance or to pay fees, assessments, charges and taxes, all as specified in this Lease, Lessor shall have the right, but shall not be obligated, to effect such insurance, or pay said fees, assignments, charges and taxes, as the case may be. In that event, the cost thereof shall be repayable to Lessor with the next installment of rent, and failure to repay the same shall carry with it the same consequences, including interest at ten percent (10%) per annum, as failure to pay any installment of rent.

13. Indemnity.

Lessee shall indemnify Lessor against, and hold Lessor harmless from, any and all claims, actions, suits, proceedings, costs, expenses, damages and liabilities, including reasonable attorney's fees and costs, arising out of, connected with, or resulting from Lessee's use of the

*The original document is held by ABC Leasing Company and this copy was created on 05/25/2016 09:57:17 AM EDT.*
*Transaction: 1457337; Document: 1453318*

FIG. 4C

This is a copy of a document that is managed by the electronic vault

Equipment, including without limitation the manufacture, selection, delivery, possession, use, operation, or return of the Equipment.

14. Default.

If Lessee fails to pay any rent or other amount herein provided within ten (10) days after the same is due and payable, or if Lessee fails to observe, keep or perform any other provision of this Lease required to be observed, kept or performed by Lessee, Lessor shall have the right to exercise any one or more of the following remedies:

A. To declare the entire amount of rent hereunder immediately due and payable without notice or demand to Lessee.
    B. To sue for and recover all rents, and other payments, then accrued or thereafter accruing.
    C. To take possession of the Equipment, without demand or notice, wherever same may be located, without any court order or other process of law. Lessee hereby waives any and all damages occasioned by such taking of possession.
    D. To terminate this Lease.
    E. To pursue any other remedy at law or in equity.

Notwithstanding any repossession or any other action which Lessor may take, Lessee shall be and remain liable for the full performance of all obligations on the part of the Lessee to be performed under this Lease. All of Lessor's remedies are cumulative, and may be exercised concurrently or separately.

15. Bankruptcy.

Neither this Lease nor any interest therein is assignable or transferable by operation of law. If any proceeding under the Bankruptcy Act, as amended, is commenced by or against the Lessee, or if the Lessee is adjudged insolvent, or if Lessee makes any assignment for the benefit of his creditors, or if a writ of attachment or execution is levied on the Equipment and is not released or satisfied within ten (10) days thereafter, or if a receiver is appointed in any proceeding or action to which the Lessee is a party with authority to take possession or control of the Equipment, Lessor shall have and may exercise any one or more of the remedies set forth in Section 14 hereof; and this Lease shall, at the option of the Lessor, without notice, immediately terminate and shall not be treated as an asset of Lessee after the exercise of said option.

16. Ownership.

The Equipment is, and shall at all times be and remain, the sole and exclusive property of Lessor; and the Lessee shall have no right, title or
interest therein or thereto except as expressly set forth in this Lease.

The original document is held by ABC Leasing Company and this copy was created on 05/23/2016 09:57:17 AM EDT. Transaction: 1457337; Document: 1453318

FIG. 4D

This is a copy of a document that is managed by the electronic vault

17. Additional Documents.

If Lessor shall so request, Lessee shall execute and deliver to Lessor such documents as Lessor shall deem necessary or desirable for purposes of recording or filing to protect the interest of Lessor in the Equipment including, but not limited to a UCC financing statement.

18. Entire Agreement.

This instrument constitutes the entire agreement between the parties on the subject matter hereof and it shall not be amended, altered or
changed except by a further writing signed by the parties hereto.

19. Notices.

Service of all notices under this Agreement shall be sufficient if given personally or mailed certified, return receipt requested, postage
prepaid, at the address hereinafter set forth, or to such address as such party may provide in writing from time to time.

If to Lessor:

ABC Leasing Company
351 Camden Street
Baltimore, Maryland 21201

If to Lessee:

Johnny Cake
Joe Lessee, LLC
351 W. Camden Street
Baltimore, Maryland 21201

20. Assignment.

Lessee shall not assign this Lease or its interest in the Equipment without the prior written consent of Lessor.

21. Headings.

Headings used in this Lease are provided for convenience only and shall not be used to construe meaning or intent.

22. Governing Law.

This Lease shall be construed and enforced according to laws of the State of Maryland.

The original document is held by ABC Leasing Company and this copy was created on 05/25/2016 09:57:17 AM EDT. Transaction: 1457337; Document: 1453318

FIG. 4E

This is a copy of a document that is managed by the electronic vault

*Val Daly*

WITNESS THE SIGNATURES OF THE PARTIES TO THIS AGREEMENT TO LEASE EQUIPMENT:

LESSOR:

Sign: _____
Print: _____
Date: _____

LESSEE:

Sign: _____
Print: _____
Date: _____

The original document is held by ABC Leasing Company and this copy was created on 05/25/2016 09:57:17 AM EDT. Transaction: 1457337; Document: 1453318

FIG. 4F

METHOD FOR CONVERSATION OF AN ORIGINAL PAPER DOCUMENT INTO AN AUTHENTICATED ORIGINAL ELECTRONIC INFORMATION OBJECT

CROSS-REFERENCE TO RELATED APPLICATION(S)

The present application derives priority from U.S. Provisional Patent Application 62/168,384 filed 29 May 2015.

BACKGROUND OF THE INVENTION

1. Field of the Invention

The present invention relates generally to methods for providing a verifiable chain of evidence and security for the conversion of an original paper document into an authenticated, original electronic information object in digital format.

2. Description of the Background

The continuing evolution of the methods of commerce is evident in the increasing replacement of paper-based communications with electronic communications. When communication is electronically reproduced messages such as e-mail, facsimile machine, imaging, electronic data interchange or electronic fund transfer, there no longer exists a signature or seal to authenticate the identity of a party to a transaction. Moreover, such electronic communication methods result in the production of multiple, identical copies of such messages, which make it unclear as to which of such copies, if any, is to be considered the "original" authoritative version, for all purposes.

To address these problems, a trusted repository electronic vault authentication system (the "Trusted Repository") has been described that provides the needed security and protection during creation and ongoing maintenance of electronic documents and other information objects, and that advantageously utilizes an asymmetric cryptographic system to help ensure that a party originating an information object is electronically identifiable as such. As an initial matter, it will be helpful to understand the following terminology that is common in the field of secure electronic commerce and communications.

"Public key cryptography (PKC)" uses pairs of cryptographic "keys", each pair having a private (secret) key and a public key that are associated with respective registered users. The public keys are published for anyone to use for encrypting information intended for the respective users. Only the holder of the paired private key can read information, i.e., an electronic document or more generally an information object that was encrypted using the respective public key. Conversely, an electronic document that is "digitally signed" using a user's private key can be verified as that user's by anyone who knows the user's public key. The encrypt and decrypt functions of both keys are truly "one-way", meaning that no one can determine a private key from the corresponding public key, and vice versa, which in popular PKC systems is due to the fact that, at least currently, finding large prime numbers is computationally easy but factoring the products of two large prime numbers is computationally difficult. Example PKC algorithms, which comply with applicable government or commercial standards, are the digital signature algorithm (DSA/RSA) and secure hash algorithm (SHA-2/MD5).

Various aspects of public-key cryptographic (PKC) systems are described in the literature, including R. L. Rivest et al., "A Method for Obtaining Digital Signatures and Public-Key Cryptosystems," Communications of the ACM vol. 21, pp. 120 126 (February 1978); M. E. Hellman, "The Mathematics of Public-Key Cryptography", Scientific American, vol. 234, no. 8, pp. 146 152, 154 157 (August 1979); and W. Diffie, "The First Ten Years of Public-Key Cryptography", Proceedings of the IEEE, vol. 76, pp. 560 577 (May 1988). It can also be noted that for a PKC system, as for other cryptographic systems, the system's strength, i.e., the computational effort needed to break an encrypted message, depends to a great extent on the length of the key, as described in C. E. Shannon, "Communication Theory of Secrecy Systems", Bell Sys. Tech. J. vol. 28, pp. 656 715 (October 1949).

A "digital signature" is an unforgeable data element, which is logically associated, applied or attached to an electronic document or other information object with the intent or commitment of the signer to sign or otherwise be bound by the terms of the electronic document or other information object. A digital signature is typically created by "hashing" the electronic document, encrypting the resulting hash (integrity block) using the user's private (secret) key, and appending the encrypted hash to the electronic document or other information object.

An "electronic signature" is one of the mechanical, holographic, digital, voice or biometric signatures, or such other electronic sound, symbol(s), or process which is logically associated, applied or attached to an electronic document with the intent or commitment of the signer to sign or otherwise be bound by the terms of the electronic document.

An "authentication certificate" is an unforgeable digitally signed data element that binds a user's public key to the user's identity information and that advantageously, but not necessarily, conforms to the international standard X.509 version 3, "The Directory-Authentication Framework 1988", promulgated by the International Telecommunications Union (ITU). Each authentication certificate includes the following critical information needed in the signing and verification processes: a version number, a serial number, an identification of the Certification Authority (CA) that issued the certificate, identifications of the issuer's hash and digital signature algorithms, a validity period, a unique identification of the user who owns the certificate, and the user's public cryptographic signature verification key. Authentication certificates are issued and digitally signed by a CA that is responsible for ensuring the unique identification of all users.

An authentication certificate is a digital "ID", much like a driver's license or other documentation that is used to verify a person's identity. The original information object public key infrastructure can use the X.509v3 certificate that is based on an ISO/ITU standard, as interpreted by the Internet Engineering Task Force (IETF) Public Key Infrastructure X.509 (PKIX) recommendations. These certificates are digitally signed by the issuing Certification Authority, which ensures both content and source integrity. The act of digitally signing makes the certificates substantially tamper-proof, and therefore further protection is not needed. The intent of the certificate is to reliably associate (bind) a user's name to the user's public cryptographic key. The strength of protection equates directly to the strength of the algorithm and key size used in creating the issuer's digital signature (hash and digital signature algorithms). A certificate therefore securely identifies the owner of the public key pair, which is used to provide authentication, authorization, encryption, and non-repudiation services. A typical certificate has the following form: [Version, Serial No., Issuer Algorithm (Hash & Digital Signature), Issuer Distinguished Name (DN), Validity Period, Subject DN, Subject Public Key Info, Issuer Unique Identifier (optional), Subject Unique Identifier (optional), Issuer Public Key, Extensions (e.g., Subject Alt Name), Issuer Digital Signature]. A unique DN is formed by concatenating specific information (e.g., country, locality, organization, organization unit, e-mail address, common name).

Certificate extensions can also be used as a way of associating additional attributes with users or public keys, and for managing the public key infrastructure certificate hierarchy. Guidance for using extensions is available in the recommendations of ITU X.509v3 (1993)/ISO/IEC 9594 8:1995, "The Directory: Authentication Framework" or in IETF Internet X.509 Public Key Infrastructure Certificate and CRL Profile<draft-ietf-pkix-ipki-part1-11>.

A user's authentication certificate is advantageously and preferably appended to an electronic document or other information object with the user's digital signature so that it is possible to verify the digital signature.

"Public Key Infrastructure (PKI)" is the hierarchy of CAs responsible for issuing authentication certificates and certified cryptographic keys used for digitally signing and encrypting information objects. Certificates and certification frameworks are described in C. R. Merrill, "Cryptography for Commerce—Beyond Clipper", The Data Law Report, vol. 2, no. 2, pp. 1, 4 11 (September 1994) and in the X.509 specification, which are expressly incorporated by reference in this application.

A "lock flag" is one of the meta data properties of an information object and is used by computing systems to ensure the complete performance of system actions which comprise a series of steps. When a system user requests that a system action be performed against an information object and that system action is comprised of a series of steps that must be performed by the system on the information object, the lock flag is populated by the system with an identifier for the system action. Any time the system attempts to take an action on an information object, the information object's lock flag is checked. If the lock flag contains an identifier, the identifier is verified to confirm that the attempted action is part of the series of steps corresponding to the identifier. If the identifier and the attempted action are associated, the action is allowed to proceed with respect to the information object. If the identifier and the attempted action are not associated, the attempted action is blocked by the system and the user is notified of an error. When the final action in the series of steps of the system action identified by the lock flag are complete, the system removes the identifier from the lock flag thereby "unlocking" the information object for future system actions.

As described in U.S. Pat. Nos. 5,615,268, 5,748,738, 6,237,096, 6,367,013, 7,162,635, 7,743,248, and 8,924,302 to Bisbee et al., an original electronic document or information object having the same legal weight as a blue-ink-signed paper document (e.g., a negotiable instrument) is made possible by contract and by the PKI and associated computer technology. An electronic document, or more generally an information object, is created and transferred to a third-party Trusted Repository that is specifically designed and empowered by contract to securely and reliably store any such object for its full effective life. The contractual aspect is an agreement between the Trusted Repository and the party submitting or relying on the electronically signed information object to accept reliance on the Trusted Repository as the custodian of the information objects. To do this the Trusted Repository creates a single copy of an electronic document or information object stored in the electronic vault, which copy is designated by the parties as the authoritative copy, and maintains a custody chain for securely storing such authoritative original electronic information objects without the Trusted Repository ever relinquishing control of the authoritative original electronic information object. This is necessary for compliance with electronic transaction laws more fully discussed below, and a third-party operated Trusted Repository has been described that provides the needed security and protection of electronic documents. The Trusted Repository advantageously utilizes an asymmetric cryptographic system that help to ensure that a party originating an electronic document for deposit into the Trusted Repository is identifiable as such and that protects the integrity of electronically stored documents and other information objects during and after origination. This Trusted Repository is one aspect of the present method for secure transmission, storage, and retrieval of information objects and is described in U.S. Pat. Nos. 5,615,268, 5,748, 738, 6,237,096, 6,367,013 and 7,020,645 to Bisbee et al. which are expressly incorporated herein by reference.

The Trusted Repository implements defined business rules for the transactions handled by the Trusted Repository (i.e., a complete set of authorized actions). The Trusted Repository also implements a defined security policy (i.e., a set of protective measures that is necessary to prevent unauthorized actions). The Trusted Repository uses its business rules and security policy to govern transaction requests and access to the repository over the respective life cycles of all documents and information objects within its control, verifying the identities and authorities of parties (local and remote) requesting repository services. The Trusted Repository securely stores and securely retrieves digitally signed, authenticated, and encrypted electronic documents or information objects. Upon request, the Trusted Repository prints and issues certified copies of electronic documents or information objects. The Trusted Repository advantageously supports a multi-port token server for proving document authenticity, for verifying the identities of signing and accessing parties, and for authenticating document submissions. The Trusted Repository provides for backup and disaster recovery, and ensures that stored information is not lost within a specified retention period, whether that period is specified by a user, law, or regulation.

A "signature block" includes at least two components: signer information and certificate information. Signer information contains the hash of the information object(s) (i.e., its content) with an authenticated attribute, electronic signature, and unauthenticated attribute appended. The authenticated attribute field contains pertinent additional information relating to the act of signing and is protected by the signer's electronic signature. A hash is computed over both the information object(s)' hash and authenticated attribute fields and encrypted using the signer's private key, thereby creating a digital signature. The unauthenticated attribute can be used to convey additional information to the Trusted Repository and/or by the Trusted Repository to the information object when the signature arrives at the Trusted Repository. Certificate information contains the signer's X.509 certificate. It may also contain some form of attribute certificate signed by a Trusted Repository recognized issuing authority. This attribute certificate is used to convey additional qualifying information about the signer that may be used by the business rules established for the Trusted Repository in making access control decisions.

It is also important to note that a digital signature is not valid indefinitely but only during the validity period of its authentication certificate. The validity period of an authentication certificate is also not indefinite but typically is set so as to limit the chances for compromise of the digital signature, e.g., as a result of theft of the secret signature key or decreased cryptographic viability. Validity periods can be in the range of one year to three years, although other periods are also possible. A Trusted Repository's authentication certificate's validity period is normally longer than the validity period of a user's certificate, and the cryptographic strength of a Trusted Repository's certificate is normally stronger than that of a user's certificate. For these reasons and because of the Trusted Repository's verification of content integrity and of digital signature(s) and certificate(s) validity on receipt of an information object, the validity period of the Trusted Repository's digital signature as conveyed in the Trusted Repository's certificate may supersede, or extend, the validity period(s) of the received information object's digital signature(s), provided the Trusted Repository physically protects the received information object's contents from external tampering.

With all of the advantages of original electronic documents or information objects that are provided by the U.S. patents referenced above, one portion of the overall workflow that is prone to risk, at least in conventional systems, is the initial deposit of the authoritative electronic information object with the Trusted Repository. Copies of an information object that exist outside of the control of a Trusted Repository must not be able to be mistaken for the authoritative "original" information object. An original information object may be effective as a blue-ink-signed paper document when one or more digital signatures are applied during deposit into a Trusted Repository that reliably and securely stores original information objects for their full effective lives.

Electronic transaction laws include those such as Revised Article 9 of the Uniform Commercial Code (the "UCC") which allows for the creation and maintenance of "Electronic Chattel Paper"—defined as Chattel Paper evidenced by a record or records consisting of information stored in an electronic medium. The UCC generally defines Chattel Paper as a record or records that evidence both a monetary obligation and a security interest in specific goods. In conventional processes, Chattel Paper consists of blue-ink-signed paper original documents. Often there are multiple copies of the Chattel Paper, with one of such copies marked as "original" and the others marked as "copy". A party having a the security interest in the Chattel Paper must have physical possession of the tangible original Chattel Paper to "perfect" their security interest—protecting that interest against claims of third parties to ensure the secured party collects on its interest before claims of third parties are considered.

Official Comments to the UCC discuss the business needs and contexts for converting blue-ink-signed paper original Chattel Paper into Electronic Chattel Paper (and vice versa) as well as the several requirements to establish "control" of the Electronic Chattel Paper, which is the electronic equivalent of possession of tangible Chattel Paper. Such requirements include the ability of the computing system and process for creating and maintaining the Electronic Chattel Paper to establish that "a single authoritative copy of the record [ . . . ] exists which is unique, identifiable, and [ . . . ] unalterable", that each copy of the authoritative copy "is readily identifiable as a copy that is not the authoritative copy", and that "any amendment of the authoritative copy is readily identifiable as an authorized or unauthorized revision". U.C.C. § 9-105. Processes for deposit into a Trusted Repository of blue-ink-signed paper documents representing Chattel Paper may successfully establish a resulting authenticated electronic information object as the unique, identifiable, and unalterable authoritative copy—the "original" Electronic Chattel Paper—for all future intents and purposes.

SUMMARY OF THE INVENTION

Applicants' inventions solve these and other problems suffered by prior approaches to creating the original electronic information object of a blue-ink-signed paper document.

In Applicants' invention, a method is provided for securely converting an original paper document into an original electronic information object, and for subsequent electronic transmission, storage, and retrieval of verifiable copies of the stored original electronic information object, without the Trusted Repository relinquishing control of the original electronic information object.

To successfully convert a blue-ink-signed paper document into an original authenticated electronic information object reliably maintained by a Trusted Repository, the user must first convert the blue-ink-signed paper document into an electronic information object. On deposit of this information object into the Trusted Repository, the user is required to destroy the blue-ink-signed paper document and the locally-retained copy of the deposited electronic information object or otherwise permanently designate them as copies. The Trusted Repository then requires the user to establish the authenticity of the deposited electronic information object by verifying that the deposited electronic information object is now the only authoritative and original copy. Successful authenticity verification attests to the legitimacy of the submitted electronic information object. The Trusted Repository then creates the authenticated original electronic information object by appending a date-time stamp and its digital signature and certificate. This Trusted Repository action demonstrates the Trusted Repository's assumption of control of the authenticated original electronic information object.

BRIEF DESCRIPTION OF THE DRAWINGS

FIG. 2 is an exemplary Transaction Activity History Report.

FIG. 3 is an exemplary Document Activity History Report.

FIGS. 4A-F collectively comprise an exemplary copy of an authenticated original electronic information object reflecting the Trusted Repository authentication certifications.

FIG. 4A is page 1 of the authenticated original electronic information object of FIG. 4.

FIG. 4B is page 2 of the authenticated original electronic information object of FIG. 4.

FIG. 4C is page 3 of the authenticated original electronic information object of FIG. 4.

FIG. 4D is page 4 of the authenticated original electronic information object of FIG. 4.

FIG. 4E is page 5 of the authenticated original electronic information object of FIG. 4.

FIG. 4F is page 6 of the authenticated original electronic information object of FIG. 4.

DETAILED DESCRIPTION OF THE PREFERRED EMBODIMENT

Figure 1:
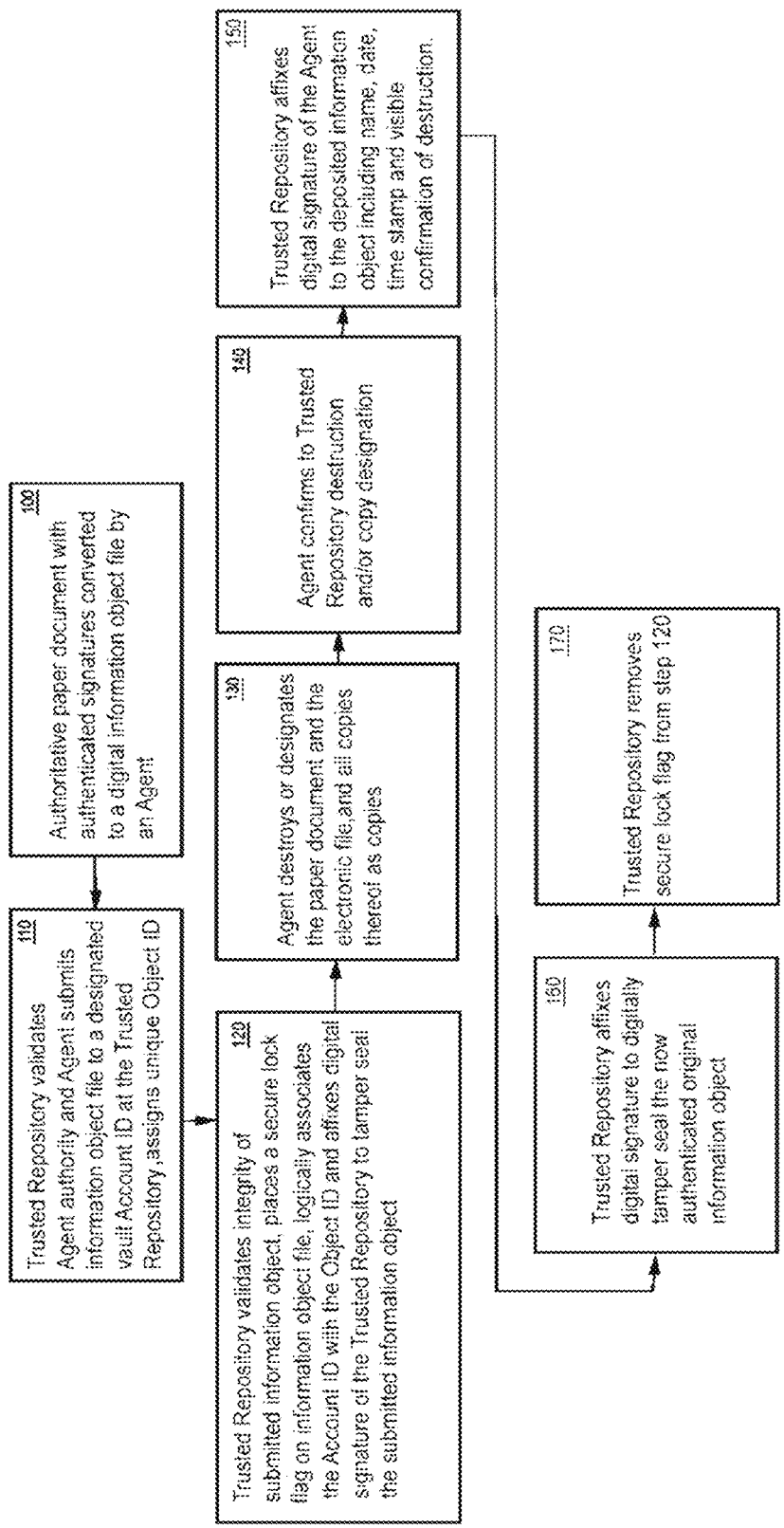
FIG. 1 is a block diagram illustrating the eight basic steps of the process according to the present invention.

As described above, it is generally desirable to provide software solutions and services to commercial leasing, mortgage, government, financial and other industries that facilitate legally enforceable wholly electronic loan and contract documents in transactions. The goal is to allow customers to sign, vault, manage, transfer ownership of, pledge, collateralize and securitize electronic contracts without any concern that the valuation or legal enforceability of such contracts will be diminished by the use of electronic format or by the failure to execute or render the contracts in hardcopy.

The result of a standard business commercial transaction is the generation of original blue-ink-signed paper records or documents. The owner of such records or documents may then wish to convert the blue-ink-signed paper record or document into an authenticated original electronic information object reliably maintained by a Trusted Repository. A Trusted Repository typically includes one or more servers (including one or more processors), storage media, and input-output devices as known to those having ordinary skill. For example, eOriginal provides its eCore® electronic vault solution as a Trusted Repository to maintain the security of third party data, documents and other records. The document owner may, by contract with the provider of the Trusted Repository, establish an account on the Trusted Repository (an "Account", making the document owner the "Account Owner"), and obtain rights to assign authorizations to agents to access the Account on the Trusted Repository (each an "Agent") and to deposit electronic information objects, including documents and other records, into the Account. Such access and deposits may be achieved using a secure web portal or the software's application program interface (API) calls. The Trusted Repository also assigns each Account on the Trusted Repository a unique system identifier (the "Account ID"). Through this process, the owner of a particular blue-ink-signed paper document likewise retains ownership of the electronic information objects stored in such owner's Account on the Trusted Repository. Applicants' issued U.S. Pat. No. 8,924,302 discloses an exemplary Trusted Repository system architecture, the disclosure of which is herein incorporated by reference. The Trusted Repository employs centralized software to implement defined business rules for the information objects handled by the Trusted Repository (i.e., a complete set of authorized actions). The Trusted Repository also implements a defined security policy (i.e., a set of protective measures that is necessary to prevent unauthorized actions). The Trusted Repository uses its business rules and security policy to govern requests and access to the Trusted Repository over the respective life cycles of all documents and other information objects within its control, verifying the identities and authorities of parties (local and remote) requesting access. U.S. Pat. No. 8,924,302 further describes use of the Trusted Repository software functionality to electronically sign electronic contracts and documents within the Trusted Repository using various types of signatures permitted under electronic transactions laws such as the Electronic Signatures in Global and National Commerce Act (ESIGN Act).

However, it has heretofore been difficult to successfully convert a blue-ink-signed paper document into an authenticated original electronic information object maintained by the Trusted Repository in an Account Owner's Account due to the complexity of the business rules, the complexity of the software needed to implement those rules, and the need for the Trusted Repository to exercise strictest security protocols throughout this process. The present invention provides a solution in the form of a method for creating an authenticated original electronic information object in digital format from an original blue-ink-signed paper document, along with a verifiable chain of evidence and security for the creation. The method can be implemented utilizing commercially available computer systems and technology as described above to create an integrated closed system for the creation and authentication of electronic information objects.

Applicant's method, in general terms, does the foregoing with an eight-step process combining business and technical procedures required to convert an original paper document into an authoritative and authenticated original electronic information object.

FIG. 1 is a block diagram illustrating the eight basic steps of Applicant's process.

At step 100, a pre-existing authoritative paper document bearing authenticated signatures, such as a wet-ink-signed paper original document, is converted to a digital electronic file by an Agent of an Account Owner with an Account on a Trusted Repository. The term Agent as used in this application refers generally to an entity which attests to the integrity and validity of an information object upon its submission to a Trusted Repository for deposit as an original electronic information object and which is authorized to submit such information objects to the Trusted Repository and to permanently destroy or mark the authoritative paper documents after submission of the corresponding information object. In the most common use case, the Agent is also the Account Owner. As described above, the Trusted Repository is a third-party trusted repository authentication system which includes an electronic vault that is specifically designed and empowered by contract to securely and reliably store any such information object for its full effective life. The Trusted Repository is contractually bound by agreement between the provider of the Trusted Repository and the Account Owner(s) submitting or relying on the authoritative paper document to accept reliance on the Trusted Repository to serve as a repository vault and custodian of the authenticated original electronic information object derived from the authoritative paper document.

For the sake of brevity, the term "authenticated original information object" will be used to refer to an authenticated electronic information object created by a process involving a Trusted Repository and an Agent, and the term "transaction" will be used to refer to a deal or negotiated arrangement that corresponds to or is defined by a set of authenticated original information objects. It will be understood that an authenticated original information object is itself an electronic information object, and the underlying formatting of an authenticated original information object enables parsing and processing for performing verification and validation of one or more of its digital signatures, and may enable extraction of the original contents for viewing or processing. Conversion of the authoritative paper document to an electronic information object file may be accomplished with any suitable sheet-fed, flatbed or other image scanner ("scanner") that optically scans the document and converts it to a digital image or some other digital format file such as PDF or JPG, where the resulting information object accurately represents all content elements of the authoritative paper document. Conversion may also be accomplished by other means such as digital photography or facsimile.

At step 110 the Agent of the Trusted Repository logs onto a secure web portal and enters its credentials (username and password and a designation for the Account which the Agent is authorized to access) or such Agent directly provides its credentials to the Trusted Repository using the appropriate software API call. The Agent then initiates the deposit process by creating a transaction profile and a document profile on the Account to receive the electronic information object file and electronically submits the newly created (converted) electronic information object file to the Account at the Trusted Repository. The Agent may alternatively select an existing transaction profile on the Account and create a document profile under such existing transaction profile to receive the electronic information object file. The Trusted Repository then validates the Agent's credentials and rights to act on behalf of the Account Owner and, once it is determined that an Agent has the proper authorizations, the Trusted Repository permits the deposit of the information object file to the Trusted Repository.

At step 120, upon successful deposit of the information object file, the Trusted Repository may verify the integrity of the submitted information object. The Trusted Repository then automatically assumes custody and control of the information object submitted by that Agent and responsibility for such information object's preservation by assigning a unique system identifier to the submitted information object (the "Object ID"), flagging (attaching a tag to) the file, which designates it as properly received, and immediately placing a secure lock flag on the received information object file to ensure that no other action is taken during the submission process. The Trusted Repository further logically associates the Account ID with the Object ID to establish the submitted information object as belonging to the Account Owner. Automatically after verification of the submitted information object the Trusted Repository affixes the digital signature of the Trusted Repository to the submitted information object. This digital signature of the Trusted Repository digitally tamper seals the now deposited information object using industry standard digital certificate technology. Preferably, the tamper seal is accomplished with an X.509 digital certificate, or its successor, issued by a certification authority to the Trusted Repository. The X.509 digital certificate associates the Trusted Repository identity with a public key value. More specifically, the certificate includes at least the Trusted Repository identity (the certificate owner), the public key associated with the Trusted Repository, X.509 version information, a serial number that uniquely identifies the certificate, the certification authority, the digital signature of the Trusted Repository, and information about the algorithm used to sign the digital signature. The digital signature applied by the Trusted Repository eliminates the possibility of unauthorized alteration or tampering with the information object subsequent to its original sealing.

The Trusted Repository will allow the Agent to repeat steps 110 and 120 before proceeding, thereby allowing for the deposit of multiple information object files to the Trusted Repository using the appropriate software API call. On the other hand, if the agent is using the secure web portal he or she must perform the entire process (steps 110-170) as to each information object file before initiating the process again for the next one.

One skilled in the art will understand that the actual substeps of steps 110 and 120 may differ slightly depending on whether the Agent is using a secure web portal or API calls. If the latter, at step 110 the Agent calls a create profile API to create the document profile on the Account. At step 120 the Agent then calls an upload doc API. Once it is determined that an Agent has the proper authorizations, the Trusted Repository permits the deposit of the information object file to the Trusted Repository, validates and tamper seals the information object file as above. The Agent then calls a "submit as Paper In" API. This API call triggers the Trusted Repository to apply the lock flag to the sealed information object as described above. The API calls are made on a sequential basis, as opposed to use of a secure web portal in which case the Agent is confronted with a single screen graphical user interface (GUI). The Agent is able to select or fill out the document profile on the Account, browse to select an information object for upload, and just click a button on the GUI to submit the information object to the Trusted Repository for the remainder of the process (i.e., apply the lock flag, etc.). Thus, with the secure web portal when the Agent clicks "Submit" on the GUI screen this sends the equivalent of all three API calls to the Trusted Repository at the same time and they are processed almost instantaneously.

At step 130, upon successful deposit and locking of the information object file, the Agent must destroy or otherwise permanently designate the source file, the original paper document, and all copies of each as not being the original. Both the paper document and the locally-retained version of the scanned electronic copy must be destroyed or permanently marked as copies. It is essential, for purposes of the present invention, that the Agent maintains the capability to prove, via documented and enforced policies or other artifacts, that the original paper document, the digital source file, and all copies thereof have been destroyed or otherwise marked as copies. The version held in the Trusted Repository thus remains the authoritative and only original information object, and step 130 accomplishes this.

At step 140, the Agent provides notice to the Trusted Repository that the destruction or marking of the original paper document, the digital source file, and all copies thereof have been completed. This notification or verification may be accomplished directly through a secure web portal extended to the Agent, such as by a certification designation on the user interface (GUI) that allows the Agent to certify destruction and/or copy designation. Alternatively, this notification may be accomplished by the Agent calling the appropriate software API call which triggers the application of the Agent's digital signature.

Automatically upon receipt of this notification or verification, at step 150 the Trusted Repository affixes the digital signature of the Agent to the deposited information object. The Agent's digital signature includes a visible representation that includes the Agent's name, date and time stamp, prefaced by the text "confirmed paper destruction by . . . ".

Automatically after affixation of the Agent's digital signature confirming destruction and/or copy designation, at step 160 the Trusted Repository affixes the digital signature of the Trusted Repository to the now authenticated deposited information object. The digital signature applied by the Trusted Repository eliminates the possibility of unauthorized alteration or tampering with an object by the signatories subsequent to its original execution or sealing. In addition, the Trusted Repository's digital signature can advantageously provide for non-repudiation, i.e., precluding the originator from disavowing the object. This action by the Trusted Repository marks the Trusted Repository's assumption of custody and control of the now authenticated original information object.

At step 170, after the entire submitted information object has been authenticated and digitally tamper sealed, the secure lock flag (step 120) on the authenticated original information object is removed. Removal of the lock flag allows other Trusted Repository actions to be taken by authorized Agents with respect to the authenticated original information object.

The events of the foregoing steps at 110, 120, 140, 150 and 160 are recorded and become part of an electronic event log maintained by the Trusted Repository. The event log is associated by the Trusted Repository with the authenticated original information object and reflects completion of certain steps of the present process. A portion of the event log known as the audit trail is maintained by the Trusted Repository for so long as the associated authenticated original information object is maintained within the Trusted Repository and after the destruction or removal from the Trusted Repository of the associated authenticated original information object. The audit trail includes the events of the foregoing steps at 120, 140, 150 and 160 with respect to the associated authenticated original information object.

At this point, after step 170, the authenticated original information object residing in the Trusted Repository vault is the authoritative and original copy. Further the authenticated original information object is:

unique as the result of the Agent's destruction of all copies at step 130 and certification of such destruction to the Trusted Repository at step 140 above;

identifiable due to the Object ID assigned by the Trusted Repository at step 120 and the Account ID associated with that Object ID by the Trusted Repository at the same step, and as a result of the application of the Agent's digital signature at step 150; and unalterable as the result of the application of the Trusted Repository digital signature tamper seals at steps 120 and 160.

Secure audit, record tracking, and record management complete the technological aspects of maintaining an authenticated original information object. The Trusted Repository stores the authenticated original information object in an Account and controls access to the Account by Agents for the benefit of the Account Owner and regarding activities permitted with respect to authenticated original information objects stored in the Account. The authenticated original information objects are stored and the corresponding Accounts are maintained by the Trusted Repository in any convenient form of memory, such as on optical and/or magnetic disks. Once a transaction is completed and the associated authenticated original information object(s) are created by the Trusted Repository, the set of authorized parties, including and not limited to Agents, who can access the Trusted Repository to obtain or further transmit an authenticated original information object may change.

To maintain a trail, or chain, of evidence, the Trusted Repository applies version controls to authenticated original information objects in an account, thereby preventing direct modification of an authenticated original information object. An authenticated original information object in an Account is replaced when an authorized Agent retrieves the authenticated original information object for actions to remove the authenticated original information object from the Account, such as a transfer of ownership (from one Account to another Account on the Trusted Repository), export from the Trusted Repository, or vault-to-vault transfer (from the Trusted Repository to another Trusted Repository), and, if elected by the authorized Agent, the Trusted Repository creates and retains in the Account an updated version consisting of a copy of the authenticated original information object which contains at least one forgery-resistant indicium or watermark that clearly identifies the rendered information as a non-authoritative copy of the former authenticated original information object. The combination of actions by the Trusted Repository, in conjunction with a protected audit trail, can be used at a future date to prove conclusively that an Agent initiated deposit of a transaction into the Trusted Repository, precluding the Agent from denying that the corresponding authenticated original information object(s) originated with that Agent and providing irrevocable proof of authenticity.

The authenticated original information object is never disclosed by the Trusted Repository. Any copy of the authenticated original information object outside of the Trusted Repository has been destroyed or permanently marked as a copy as a result of Step 130. Any copy of the authenticated original information object created by the Trusted Repository contains at least one forgery-resistant indicium or watermark that clearly identifies the rendered information as a copy of the authenticated original information object held within the Trusted Repository.

A validated instruction will cause the Trusted Repository to communicate such a marked copy of the authenticated original information object to the designated remote workstations. Preferably, HTTPS is used to protect communications between the Trusted Repository and designated workstations. The workstations incorporate methods that accurately parse and accurately display the marked copy of the authenticated original information object.

Where security is required to guarantee that the information object received at a remote workstation is a valid copy of the authenticated original information object held at the Trusted Repository, the Trusted Repository appends its digital signature and certificate to the marked copy of the authenticated original information object prior to transmission. The workstation rejects the marked copy as fraudulent if the Trusted Repository digital signature and certificate fail to test as valid. The workstation notifies the Trusted Repository in such an instance. The Trusted Repository then retransmits the digitally signed marked copy of the authenticated original information object. Appropriate actions are initiated by the Trusted Repository if the Trusted Repository failed to transmit the marked copy of the authenticated original information object.

As stated above the Trusted Repository populates an electronic event log with the data generated via the above-described processes. The electronic event log is a sequential dated and time stamped electronic record of specified system actions created and maintained by the Trusted Repository with respect to each authenticated original information object. Specifically, the events of the foregoing steps at 120, 150 and 160 are recorded and become part of the audit trail portion of the event log. The event log is associated by the Trusted Repository with the authenticated original information object and reflects certain steps of the present process. The audit trail is maintained by the Trusted Repository for so long as the associated authenticated original information object is maintained within the Trusted Repository and after the destruction or removal from the Trusted Repository of the associated authenticated original information object.

To implement the foregoing the Account Owner is assigned a unique Owner ID by the Trusted Repository, each transaction created by that Account Owner is assigned a transaction ID, and each authenticated original information object within each transaction created by that Account Owner is assigned an Object ID. The Trusted Repository maintains a hierarchical association between Owner ID, transaction ID, and Object ID. Similarly, the Trusted Repository event log includes two distinct levels of logs that are instantiated and maintained by the Trusted Repository: a transaction-level log, and object-level log. Data from the transaction-level log is used to generate a Transaction Activity History Report, and data from the object-level log is used to populate a Document Activity History Report. Those events indicated as "Audit" in the Document Activity History Report comprise the audit trail. All other events shown in the Document Activity History Report are log events displayed solely to the current Account Owner of the authenticated original information object Account Owner, and such log events do not transfer with the authenticated original information object upon any transfer of that authenticated original information object to another Account Owner. Only the audit trail transfers with the authenticated original information object—which audit trail is then updated by the Trusted Repository with additional events to reflect each action taken by any Agent of the new Account Owner with respect to such authenticated original information object, thereby constituting the new Account Owner's object-level event log, including the underlying audit log.

To illustrate, FIG. 2 is an exemplary Transaction Activity History Report, FIG. 3 is an exemplary Document Activity History Report, and FIG. 4 is an exemplary copy of an authenticated original information object reflecting the Agent authentication certification.

As seen in FIG. 2, the Transaction Activity History Report reflects two transaction-level entries from the transaction-level event log:

On May 25, 2016 at 09:53:04 AM EDT the Trusted Repository created a transaction folder in an Account on the Trusted Repository for the Account Owner known as ABC Leasing Company pursuant to the direction of the Agent ABC Leasing Company by the user known as Val Daly, to contain the information objects to be associated with transaction ID 1457317.

On May 25, 2016 at 09:53:50 AM EDT a document was added to the new transaction folder by Agent ABC Leasing Company by the user known as Val Daly while Val Daly was logged into the Trusted Repository from IP address 108.48.123.163. This single event documents at the transaction level the completion of step 110 described above wherein the Agent (ABC Leasing Company by the user known as Val Daly) of the Trusted Repository has logged onto a secure web portal (indicated on the Report as Command Center), entered their credentials, created a document profile and electronically submitted the document to the Trusted Repository. Importantly, upon an Agent's request for a copy of the event log, the Trusted Repository applies its digital signature to the log, making it tamper proof, and then is therefore able to append its certification to the Transaction Activity History Report (at bottom): "This Transaction Activity History Report was produced for . . . Transaction ID 1457317 on May 25, 2016 09:56:01 AM EDT . . . , operated for ABC Leasing Company . . . . The digital signature on this document confirms the state of the events recorded for the transaction as of the date and time of the request of this report and that no action has been altered since the action occurred . . . ."

Even more detailed entries are made on the object level. To illustrate, FIG. 3 is an exemplary Document Activity History Report that reflects six object-level entries from the corresponding object-level event log, three of which entries are included in the audit trail:

$1^{st}$: on May 25, 2016 at 09:53:50 AM EDT authorized Agent ABC Leasing Company by the user known as Val Daly as per step 110 above logged onto a secure web portal, entered their credentials, and created a document profile on the Account under the unique transaction ID 1457317 to receive the electronic information object file. The creation of the document profile caused the Trusted Repository to assign a unique Object ID to the document profile for receipt of the object file, logically associate that Object ID with the Account ID of the Account Owner to establish the submitted information object as belonging to the Account Owner, and to update the Report to show that the Agent "Created Document", or created a document profile for receipt of the uploaded file, on the Trusted Repository. The Report shows the Object ID as 1457318, the associated transaction ID as 1457317, and the Account Owner as ABC Leasing Company.

2nd: at 09:53:51 AM EDT, also as per step 110, the Agent uploaded the electronic information file onto the Trusted Repository from the user's workstation at IP address 108.48.123.163. The file upload caused the Trusted Repository update the Report to show that the Agent "Created Unsigned Document", or successfully uploaded the electronic information file onto the Trusted Repository, thereby associating the uploaded document with the unique Object ID and the document profile.

3rd: on May 25, 2016 at 09:53:51 AM EDT as per step 120, the Trusted Repository verified the integrity of the foregoing document and flagged the file as properly received. At this step, the Trusted Repository affixes the digital signature of the Trusted Repository to the deposited information object to tamper seal the submitted document, and applied the secure lock flag to the file to prevent other actions from taking place on the deposited information object during the submission process. Completion of this step caused the Trusted Repository update the Report to show that the Agent "Submitted Paper In", or successfully caused the Trusted Repository to assume custody and control of the deposited information object. This event is marked with an X in the Audit column to reflect its inclusion in the object audit trail.

$4^{th}$: on May 25, 2016 at 09:54:32 AM EDT authorized Agent ABC Leasing Company, by the user known as Val Daly, as per step 140 above "Confirmed Paper Destruction", e.g., the Agent notified the Trusted Repository that the original paper document, the digital source file, and all copies thereof have been destroyed or otherwise marked as copies as required by step 130. This event is also marked with an X in the Audit column to reflect its inclusion in the object audit trail.

$5^{th}$: on May 25, 2016 at 09:54:35 AM EDT as per step 150 the Trusted Repository affixed the digital signature of the Agent to the deposited information object. As shown at the top of the last page of FIG. 4, the Agent's digital signature includes a visible representation that includes the Agent's name, date and time stamp, prefaced by the text "confirmed paper destruction by . . . ". Automatically and immediately after affixation of the Agent's digital signature confirming destruction and/or copy designation, as per step 160 the Trusted Repository affixes the digital signature of the Trusted Repository to the deposited information object to digitally tamper seal the deposited information object, and as per step 170, removes the lock flag to allow other Trusted Repository actions to be taken by authorized Agents with respect to the authenticated original information object. The Report is updated to reflect that the Trusted Repository has "Created Signed Version" of the uploaded information object. This event is also marked with an X in the Audit column to reflect its inclusion in the object audit trail. At this point, after step 170, the authenticated original information object residing in the Trusted Repository vault is the authoritative and original copy.

The Document Activity History Report also conveniently provides detailed information in the block entitled "Signature Information" regarding the digital signature of the Agent and the most current Vault Tamper Seal (the digital signature of the Trusted Repository), applied to the object, as well as the digital certificates used to apply such digital signatures. Such Vault Tamper Seal was applied as per step 160 on May 25, 2016 at 09:54:35 AM EDT.

FIG. 4 is an exemplary copy of an authenticated original information object (the signed and tamper sealed document from the 5$^{th}$ entry of FIG. 3 above on May 25, 2016 at 09:54:35 AM EDT). The copy of the authenticated original information object itself now reflects the very fact that it is managed by the Trusted Repository (top) and is marked COPY (middle) by the Trusted Repository as a copy of the authoritative authenticated original information object. As shown on the footer of each page of the information object, the Trusted Repository identifies the Account Owner of the object as well as the Object ID.

The software portion of the Trusted Repository maintains the event log, including the underlying audit trail, with respect to each event relative to the creation and uploads of information objects and populates the respective object or transaction event log with data to reflect at least the identity of the signatories, and the date and time of signing or integrity verification, as applicable. The software records each event directly—indicating whether the event was performed using a secure web portal or the software API calls. Upon each update to the object-level event log, the Trusted Repository software further affixes the digital signature of the Trusted Repository to the object-level event log to tamper seal the event log itself, including the audit trail. This digital signature eliminates the possibility of unauthorized alteration or tampering with the audit trail by any Agent subsequent to the prior sealing. If performed using a secure web portal, the process described above is repeated until all information objects uploaded by an authorized Agent for deposit and/or storage have been processed. If performed using the software API calls, the Agent may upload electronic object files in sequence for application of the Trusted Repository digital signature before the Agent is required to provide notification of destruction to the Trusted Repository proceeds at step 140 as to all deposited information object files. The above-described process is particularly well-suited for converting Chattel Paper, as defined in Revised Article 9 of the Uniform Commercial Code, which is created and signed by an obligor on tangible paper media, to Electronic Chattel Paper, as defined in Revised Article 9 of the Uniform Commercial Code, consisting of authoritative original information objects (as shown in FIG. 4). The process may also be performed with respect to ancillary documents created and signed on tangible paper media which may amend, modify, support, and/or supplement Chattel Paper.

The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

We claim:

1. A method for securely converting an original paper document into an authenticated original electronic information object and storing said authenticated original electronic information object in an account on a digital data vault of a trusted repository, and for subsequent electronic transmission, storage, and retrieval of verifiable copies of the stored authenticated original electronic information object without the trusted repository relinquishing control of the authenticated original electronic information object, comprising the steps of:

the trusted repository assigning a first unique identifier to said vault account on said trusted repository;

an authorized agent of the trusted repository converting an original hand-signed paper document into an electronic information object;

the authorized agent logging onto the trusted repository and providing credentials of the authorized agent;

the trusted repository validating the authorized agent's credentials to act on behalf of a designated vault account;

the authorized agent creating an object profile in the vault account on the trusted repository for receipt of the electronic information object;

the trusted repository assigning a unique second identifier to the object profile for receipt of the electronic information object, and associating the unique second identifier of the object profile with the unique first identifier of the vault account;

the trusted repository establishing an event log and recording in said event log a time, date and identity of the authorized agent, the associated unique first identifier associated with the electronic information object and the second unique identifier of the vault account;

the authorized agent electronically transmitting the electronic information object to said vault account on the trusted repository;

the trusted repository verifying the integrity of the electronic information object, associating the object profile with the electronic information object, and affixing the trusted repository's digital signature to the electronic information object using the trusted repository's digital certificate, wherein the digital certificate includes at least the trusted repository's identity, an associated public key, a certificate serial number, an identity of the certification authority, the digital signature of the trusted repository, and an algorithm used to sign the digital signature;

the trusted repository attaching a tag designating the electronic information object as properly received and placing a secure lock on the electronic information object that prevents all file operations other than the submission process, whereby the trusted repository thereby assumes control and custody of the electronic information object;

the trusted repository recording the affixation of the trusted repository's digital signature to the electronic information object and placing the secure lock on the electronic information object in said event log evidencing assumption of control and custody of the electronic information object by the trusted repository;

the authorized agent destroying or permanently designating both the original hand-signed paper document and any copies of the electronic information object as a copy;

the authorized agent notifying the trusted repository that said original hand-signed paper document and such copies thereof are destroyed or marked as copies and the electronic information object now stored in the vault account on the trusted repository is the authoritative original electronic information object;

the trusted repository affixing a digital signature of the authorized agent to the authoritative original electronic information object, said digital signature including a visible representation bearing the authorized agent's certification that the electronic information object now stored in the vault account on the trusted repository is the authoritative original electronic information object;

the trusted repository recording the affixation of the authorized agent's digital signature and its time and date in said event log evidencing the agent's notification of such destruction;

the trusted repository affixing its digital signature to the authoritative original electronic information object using its digital certificate, wherein the trusted repository digital certificate includes at least the trusted repository's identity, the associated public key, the certificate serial number, the identity of the certification authority, the digital signature of the trusted repository, and an algorithm used to sign the digital signature;

the trusted repository recording the affixation of the trusted repository's digital signature and its time and date in said event log; and the trusted repository releasing the secure lock from the authoritative original electronic information object stored in the trusted repository to allow other actions to be taken with respect to such authoritative original electronic information object.

2. The method for securely converting an original paper document into an authenticated original electronic information object according to claim 1, wherein the authorized agent converts said original hand-signed paper document into said electronic information object by optically scanning then destroying said original hand-signed paper document.

3. The method for securely converting an original paper document into an authenticated original electronic information object according to claim 1, wherein the authorized agent converts said original hand-signed paper document into said electronic information object by optically scanning said original hand-signed paper document and then marking said original hand-signed paper document a copy.

4. The method for securely converting an original paper document into an authenticated original electronic information object according to claim 1, wherein said step of the authorized agent logging onto the trusted repository and providing credentials is conducted via a secure web portal.

5. The method for securely converting an original paper document into an authenticated original electronic information object according to claim 4, wherein said steps of the authorized agent creating an object profile and transmitting the electronic information object to the vault account on the trusted repository is conducted via the secure web portal.

6. The method for securely converting an original paper document into an authenticated original electronic information object according to claim 1, wherein said step of placing a secure lock on the electronic information object comprises placing a secure lock flag on the electronic information object to prevent all file operations other than the submission process.

7. The method for securely converting an original paper document into an authenticated original electronic information object according to claim 1, wherein said step of placing a secure lock on the electronic information object triggers a visual indication on a secure web portal for authorized agents to reflect that the original electronic information object is not available for trusted repository actions other than said method.

8. The method for securely converting an original paper document into an authenticated original electronic information object according to claim 1, wherein said step of the authorized agent notifying the trusted repository that said original hand-signed paper document and any copies thereof are destroyed or marked as copies is conducted via a secure web portal using a certification made by the authorized agent that the electronic information object now stored in the trusted repository vault account is the authoritative original electronic information object.

9. The method for securely converting an original paper document into an authenticated original electronic information object according to claim 1, wherein said events consisting of:

the trusted repository affixing its digital signature to the electronic information object and placing the secure lock on the electronic information object, the authorized agent notifying the trusted repository that said original hand-signed paper document and any copies thereof are destroyed or marked as copies; and the trusted repository affixing its digital signature to the authoritative original electronic information object signed by the authorized agent;

are added to an audit record permanently associated with the authoritative original electronic information object.

10. A computer process for conversion of an original paper document into an authenticated original electronic information object in the custody of a trusted repository, comprising the steps of:

an authorized agent of said trusted repository converting a hand-signed paper document into an authenticated original electronic information object by the substeps of, the authorized agent making a digital copy of said hand-signed paper document and storing said digital copy as an electronic information object, the authorized agent logging into an account maintained by the trusted repository using credentials, the trusted repository validating the authorized agent's credentials and access rights to act on behalf of a trusted repository account owner, the authorized agent transmitting said electronic information object into the account of said account owner maintained by said trusted repository, the trusted repository comprising at least one computer server configured for the electronic deposit and storage of electronic information objects accessible only by authorized users inclusive of said authorized agent;

the trusted repository verifying the integrity of said electronic information object, and affixing the trusted repository's digital signature seal to the electronic information object using the trusted repository's digital certificate, wherein the trusted repository digital certificate includes at least the trusted repository's identity, an associated public key, a certificate serial number, an identity of the certification authority, a digital signature of the trusted repository, and an algorithm used to sign the digital signature;

the trusted repository assigning a unique system identifier to the electronic information object, and associating that identifier with a unique system identifier of said account owner;

the trusted repository establishing an audit record and recording in said audit record a time, date and identity of the authorized agent and the associated unique system identifiers of the submitted information object and said account owner;

the trusted repository attaching a tag to the electronic information object that indicates that it has been properly received, and immediately placing a secure lock on the electronic information object against all computer access;

the trusted repository requiring the authorized agent to destroy or mark said hand-signed paper document and all other physical copies thereof as copies and to delete any electronic copies, and to certify completion to the trusted repository, whereby the electronic information object is now a unique and original authenticated original information object;

the trusted repository affixing a first digital signature of the authorized agent to the authenticated original information object, said first digital signature including a visible representation comprising at least the authorized agent's name, a date and a time stamp;

the trusted repository recording a time and date of said first digital signature affixation step in said audit record reflecting the certification of the authorized agent;

the trusted repository affixing a second digital signature of the trusted repository to the authenticated original information object, said second digital signature including at least a tamper seal, a date and a time stamp;

the trusted repository recording a time and date of said second digital signature affixation step in said audit record; and the trusted repository unlocking the authenticated original information object.

11. The computer process for conversion of an original paper document into an authenticated original electronic information object in the custody of a trusted repository according to claim 10, wherein the authorized agent converts said original hand-signed paper document into an electronic information object by optically scanning then destroying said hand-signed paper document.

12. The computer process for conversion of an original paper document into an authenticated original electronic information object in the custody of a trusted repository according to claim 10, wherein the authorized agent converts said original hand-signed paper document into an electronic information object by optically scanning said hand-signed paper document and then marking said hand-signed paper document a copy.

13. The computer process for conversion of an original paper document into an authenticated original electronic information object in the custody of a trusted repository according to claim 10, wherein said step of the authorized agent logging onto an account on the trusted repository and entering credentials is conducted via a secure web portal.

14. The computer process for conversion of an original paper document into an authenticated original electronic information object in the custody of a trusted repository according to claim 10, wherein said step of the authorized agent transmitting the electronic information object to the account on the trusted repository is conducted via a secure web portal.

15. The computer process for conversion of an original paper document into an authenticated original electronic information object in the custody of a trusted repository according to claim 10, wherein said step of placing a secure lock on the electronic information object comprises placing a secure lock flag on the electronic information object to prevent all file operations other than the submission process.

16. The computer process for conversion of an original paper document into an authenticated original electronic information object in the custody of a trusted repository according to claim 10, wherein said step of the authorized agent certifying completion to the trusted repository that said hand-signed paper document and all physical copies thereof are destroyed or marked as copies and any electronic copies are deleted comprises logging onto a secure web portal and entering a certification.

17. A computer process for conversion of an original paper document into an authenticated original electronic information object held in the custody of a trusted repository on behalf of an account owner having an account with said trusted repository, comprising the steps of:

an authorized agent of said trusted repository converting a hand-signed paper document into an authenticated original electronic information object by the substeps of;

selecting an existing transaction profile and associated document profile, or creating a new transaction profile and associated document profile, said transaction profile and document profile being associated with a unique account ID designating the account owner's account, and assigning a unique object ID for an electronic information object, converting said hand-signed paper document to an electronic information object, logging onto a secure web portal and electronically submitting the electronic information object to the account owner's account at the trusted repository, destroying or permanently designating the hand-signed paper document and all copies thereof as non-original;

the trusted repository completing the substeps of, validating said agent's credentials to act on behalf of the account owner, accepting said agent's electronic submission of the electronic information object to the account designated by said unique account ID, verifying integrity of the electronic information object, attaching an indicia to the electronic information object to designate it as having been properly received, placing a secure lock on the electronic information object to prevent any file actions from being taken on it, logically associating said account ID with the object ID to establish the electronic information object as belonging to the account owner, affixing the digital signature of the trusted repository to the electronic information object, requiring said agent to certify said destruction or marking as non-original via said secure web portal, automatically upon receipt of said agent certification affixing a digital signature of said agent to the electronic information object, automatically after affixation of said agent's digital signature, affixing a digital signature of the trusted repository to the electronic information object, whereby said electronic information object is thereby designated an authenticated original information object, and unlocking the secure lock from the authenticated original information object.

* * * * *